Sept. 22, 1959 R. R. GIOVANNELLI 2,905,480
PORTABLE CARRY-ALL CART
Filed Aug. 1, 1957 2 Sheets-Sheet 1
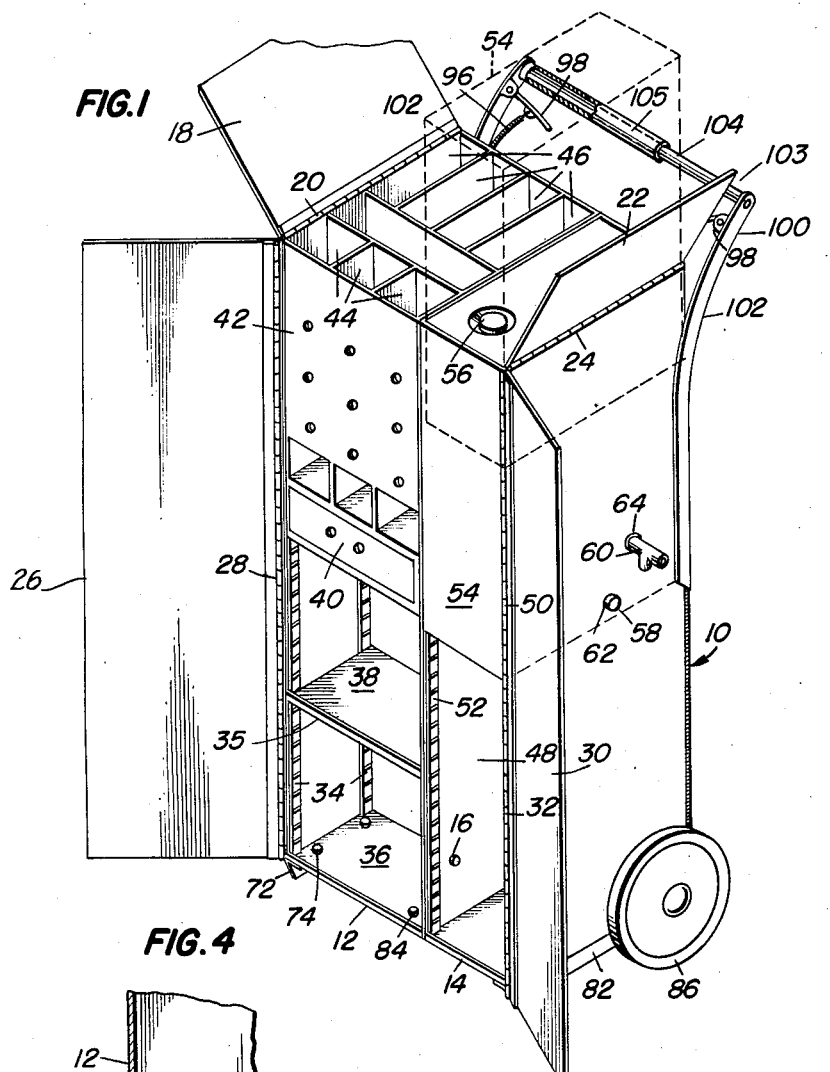
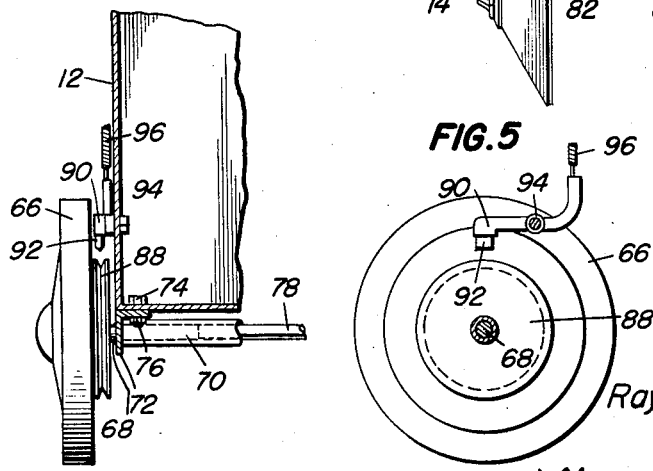
INVENTOR
Raymond R. Giovannelli
BY
ATTORNEY Sept. 22, 1959    R. R. GIOVANNELLI    2,905,480
PORTABLE CARRY-ALL CART
Filed Aug. 1, 1957    2 Sheets-Sheet 2
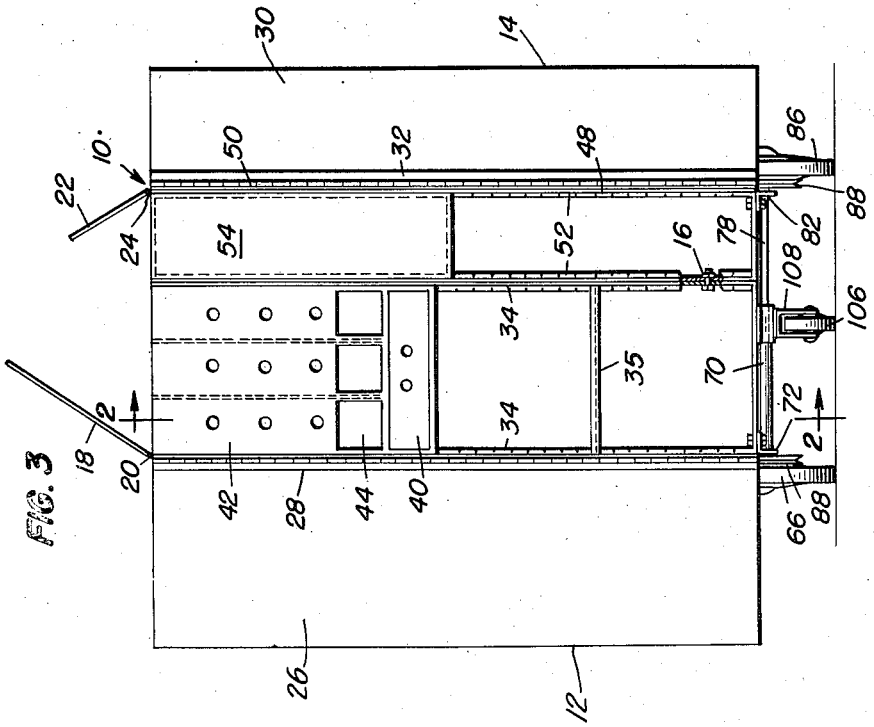
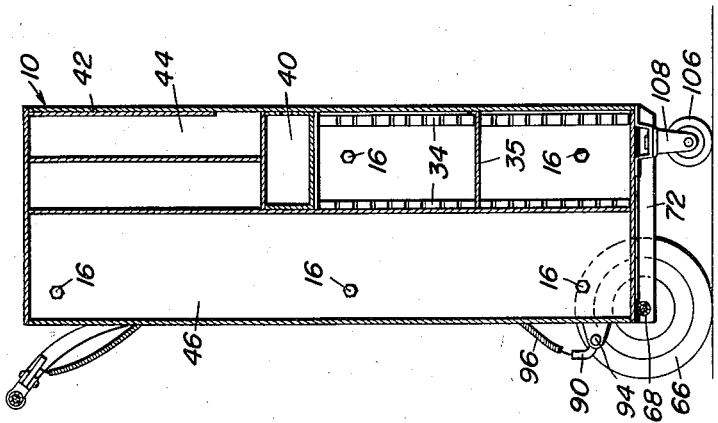
INVENTOR
Raymond R. Giovannelli
BY
ATTORNEY

United States Patent Office 2,905,480
Patented Sept. 22, 1959

2,905,480

PORTABLE CARRY-ALL CART

Raymond R. Giovannelli, North Miami Beach, Fla.

Application August 1, 1957, Serial No. 675,633

1 Claim. (Cl. 280—34)

This invention relates to a portable carry-all cart, and it particularly relates to a cart of this type which can be easily converted to a variety of different purposes.

Although various types of carts have now been placed on the market, they are all generally confined to one specific purpose such as golf carts, refreshment carts, etc. Their limited functions which adapt them only to one specific purpose makes them expensive since they must remain idle and useless except when their purpose is being served. Consequently, few people bother to obtain such carts.

It is one object of the present invention to provide a cart which, by being easily and quickly adaptable to a variety of purposes, makes its utility very great and its price worthwhile.

Another object of the present invention is to provide a portable cart which is easy to assemble and disassemble and easy to use.

Other objects of the present invention are to provide an improved cart, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a top perspective view of a device embodying the present invention.

Fig. 2 is a sectional view taken on line 2—2 of Fig. 3.

Fig. 3 is a front elevational view, partly broken away to illustrate how the sections are bolted together.

Fig. 4 is a fragmentary, enlarged, detailed view, partly in section and partly in elevation, of the wheel and brake assembly.

Fig. 5 is a side elevational view of the inner side of the assembly shown in Fig. 4.

Referring now in greater detail to the drawings wherein similar reference characters refer to similar parts, there is shown a cart, generally designated 10, comprising two separable sections designated 12 and 14 respectively. These two sections are attached to each other by bolts 16 positioned in corresponding holes in the mating side walls of the two sections and secured in place by appropriate nuts.

The top of each section is open and is adapted to be closed by a hinged door, the section 12 having such a door 18 hinged at 20 to its outer edge and the section 14 having a door 22 hinged at 24 to its outer edge. The front of each section is also open and is adapted to be closed by a door 26 hinged at 28 and a door 30 hinged at 32 respectively.

Within the section 12 there is provided a removable notched bar 34 along each edge of each side wall, these bars being releasably held in place by appropriate bolts and nuts. The notches in the bars 34 are aligned with each other and permit the insertion of any number of metal shelves 35 therebetween. In the cart illustrated in the drawings, the cart is adapted for baseball players and is provided with two front compartments 36 and 38 used to hold a catcher's glove and face mask, a front drawer 40 is used as a medicine kit, and an upper front section 42, divided into a series of elongated vertical pockets 44, is used for holding baseballs. At the rear of section 12, is provided a vertical compartment divided into a series of vertical pockets 46 for holding bats. This arrangement can be changed however, as by removing the drawer 40 and upper section 42, inserting additional notched bars 34 and installing additional shelves therebetween.

The section 14 has a lower compartment 48 and an upper compartment 50. The compartment 48 is also provided with notched bars 52 similar to bars 34 and adapted to hold similar shelves. The upper compartment 50 is adapted to hold a tank for water or the like; this tank, indicated at 54, being insertable into and removable from the compartment 50 through the top opening thereof. The tank 54 is provided with a filling opening 56 and a drain plug 58. A spigot 60 is provided at the lower end of the tank, adjacent the drain plug 58.

The drain plug 58 and the spigot 60 are both removably threaded into the water tank 54 through opening 62 and 64 in the side of the section 14. The water tank 54 is supported on the top ends of the notched bars 52, of which there are four, one being located beneath each corner thereof. In addition, the sides of the openings 62 and 64 cooperate with the plug 58 and spigot 60 to further secure the water tank in position.

At the lower rear end of the section 12 is provided a disc wheel 66 positioned on a stub axle 68 extending from one end of a tube 70. The tube 70 is mounted on an angle-iron bracket 72 extending along the width of the section 12 and held on the undersurface of its bottom wall by bolts 74 extending through the upper flange of the bracket and held in place by nuts 76.

A second stub axle 78 is telescopically received in the other end of tube 70. The axle 78 extends through an angle-iron bracket 82 similar to bracket 72. This bracket 82, by telescopically extending axle 78 into the tube 70 can be attached either to the opposite side of section 12, for which holes 84 (Fig. 1) are provided, or to the far end of section 14 when that section is assembled with section 12. A disc wheel 86, similar to wheel 66 is provided at this end of the axle 78.

On the inner side of each wheel 66, 86 is a brake drum, as shown at 88 in Figs. 4 and 5. Mounted along the side of the cart, adjacent to the wheel, is a brake finger 90 having a hard rubber nib 92. The finger 90 is pivotally mounted, as at 94 and has connected to its opposite end a brake cable 96. The brake cable 96 is connected, at its opposite end to a hand brake lever 98 mounted on the handle 100. A brake mechanism, as described above, is connected to each wheel and a brake lever is provided at each side of the handle 100, one for each wheel.

The handle 100 comprises a pair of side bars 102 connected by a telescopic handle bar 103. The handle bar 103 consists of a telescopic rod 104 and sleeve 105 so that the side bars 102, which are detachable, can be attached to either side of the section 12 when the section 14 is removed, or to either side of the complete assembly, as illustrated.

At the lower front end of the section 12, adjacent the side remote from the wheel 66, there is provided a caster 106 mounted on a bracket 108 attached to the undersurface of the section 12. This caster, in conjunction with the wheels 66 and 86 provides a firm movable support for the device.

The above-described device is adaptable to almost unlimited uses such as a baseball cart, a food cart, a portable bar, a shopping cart, etc. It can be assembled or disassembled in a matter of minutes and can be almost instantaneously converted merely by inserting or removing shelves or drawers. Its hand brakes permit it to be slowed or stopped on inclines thereby affording a maximum safety feature. Furthermore, it is easily adapted to mass production methods.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In a portable cart, the combination of a wide compartment and a narrow compartment each compartment having a bottom and side walls, means for detachably connecting adjacent side walls of said compartments whereby they may be employed alone or in combination, the connecting means comprising a registering opening in each adjacent side wall, a bolt extended through said registering openings and a nut on said bolt, a tubular axle fixed to one end of the underside of said wide section in transverse relation, and extending substantially the full width thereof, a wheel rotatably carried by said tubular axle, a stub axle telescopically mounted in said tubular axle, a releasable support for said stub axle means for selectively mounting said releasable support on a side of either the wide or the narrow section of said cart, a wheel carried by said stub axle whereby when said two sections are connected said tubular axle and said stub axle may extend the full width of said two sections and when said narrow section is detached said stub axle is carried within said tubular axle to support said wide section, a telescopic handle fixed at one end to one side of said wide section and releasably connected at its other end to said narrow section, and means for attaching the releasably connected section of said handle to the other side of said wide section and a caster wheel fixed to one side of the other end of the underside of said wide section.

References Cited in the file of this patent

UNITED STATES PATENTS

| | | |
|---|---|---|
| 1,617,644 | Littlefield | Feb. 15, 1927 |
| 1,707,186 | Chatfield | Mar. 26, 1929 |
| 1,901,509 | Hall | Mar. 14, 1933 |
| 2,409,528 | Baunach | Oct. 15, 1946 |
| 2,718,404 | Burskey | Sept. 20, 1955 |
| 2,733,094 | Carlton | Jan. 31, 1956 |

FOREIGN PATENTS

| | | |
|---|---|---|
| 740,791 | France | Nov. 21, 1932 |